US011926159B2

(12) United States Patent
Watanabe

(10) Patent No.: US 11,926,159 B2
(45) Date of Patent: Mar. 12, 2024

(54) INK-JET RECORDING APPARATUS

(71) Applicant: KYOCERA Document Solutions Inc., Osaka (JP)

(72) Inventor: Takeshi Watanabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 14 days.

(21) Appl. No.: 17/865,206

(22) Filed: Jul. 14, 2022

(65) Prior Publication Data

US 2023/0021220 A1 Jan. 19, 2023

(30) Foreign Application Priority Data

Jul. 16, 2021 (JP) ................................ 2021-117839

(51) Int. Cl.
*B41J 2/165* (2006.01)
*B41J 11/00* (2006.01)

(52) U.S. Cl.
CPC ....... *B41J 2/16523* (2013.01); *B41J 2/16526* (2013.01); *B41J 2/16579* (2013.01); *B41J 11/007* (2013.01); *B41J 2002/16591* (2013.01)

(58) Field of Classification Search
CPC .. B41J 2/16523; B41J 2/16526; B41J 11/007; B41J 2002/16591
See application file for complete search history.

(56) References Cited

U.S. PATENT DOCUMENTS

| | | | | |
|---|---|---|---|---|
| 7,497,546 | B2 * | 3/2009 | Nakashima | B41J 13/08 347/23 |
| 7,578,574 | B2 * | 8/2009 | Suzuki | B41J 2/04598 347/20 |
| 2002/0044168 | A1 * | 4/2002 | Hashi | B41J 11/0095 347/32 |
| 2006/0132572 | A1 | 6/2006 | Mochizuki et al. | 347/104 |
| 2007/0236535 | A1 * | 10/2007 | Baker | B41J 11/06 347/36 |

FOREIGN PATENT DOCUMENTS

| | | | | |
|---|---|---|---|---|
| JP | 2006-159556 | A | | 6/2006 |
| WO | WO-2021070855 | A1 | * | 4/2021 |

* cited by examiner

*Primary Examiner* — Sharon Polk
(74) *Attorney, Agent, or Firm* — Stein IP, LLC

(57) ABSTRACT

A control portion makes a recording head perform flushing processing every time a flushing area that does not overlap a recording medium faces the recording head but makes the recording head perform no flushing processing when a flushing area that at least in a part of it overlaps a recording medium faces the recording head. The longer a non-flushing period between the previous and present sessions of flushing processing, the larger the control portion makes the amount of ink ejected by each of nozzles in the present session of flushing processing.

1 Claim, 11 Drawing Sheets

INK-JET RECORDING APPARATUS

INCORPORATION BY REFERENCE

This application is based upon and claims the benefit of priority from the corresponding Japanese Patent Application No. 2021-117839 filed on Jul. 16, 2021, the entire contents of which are hereby incorporated by reference.

BACKGROUND

The present disclosure relates to an ink-jet recording apparatus.

Conventionally, there are known ink-jet recording apparatuses including a recording head. Conventional ink-jet recording apparatuses convey a recording medium using a conveying belt and eject ink from the recording head toward the recording medium being conveyed by the conveying belt to form an image on the recording medium.

SUMMARY

According to one aspect of the present disclosure, an ink-jet recording apparatus includes a conveying belt, a recording head, and a control portion. The conveying belt is supported so as to be able to move around and conveys a recording medium by circulating. The recording head is arranged opposite the recording medium and has a plurality of nozzles that are arrayed in the width direction perpendicular to the circulation direction of the conveying belt. The recording head prints on the recording medium by ejecting ink from the nozzles. The control portion controls flushing processing by the recording head. The conveying belt has a plurality of flushing areas with openings formed in it. The flushing areas are arranged at predetermined intervals from each other in the circulation direction. The control portion, during successive printing on a plurality of recording media conveyed sequentially by the conveying belt, makes the recording head perform, as flushing processing, processing in which ink is ejected from the nozzles toward the openings every time a non-overlapping flushing area, which is a flushing area that does not overlap the recording medium, faces the recording head. However, the control portion makes the recording head perform no flushing processing when an overlapping flushing area, which is a flushing area that at least in a part of it overlaps the recording medium, faces the recording head. When, during successive printing, the control portion makes the recording head perform flushing processing, the longer a period between the previous and present sessions of flushing processing, the larger the control portion makes the amount of ink ejected by each of the nozzles in the present session of flushing processing.

DETAILED DESCRIPTION

As an example of an inkjet recording apparatus according to an embodiment, a printer will be taken in the following description. For example, a printer prints an image on a sheet as a recording medium. Any of Various types of sheets such as an OHP sheet can be used as a recording medium.

<The Overall Structure of a Printer>

Figure 1:
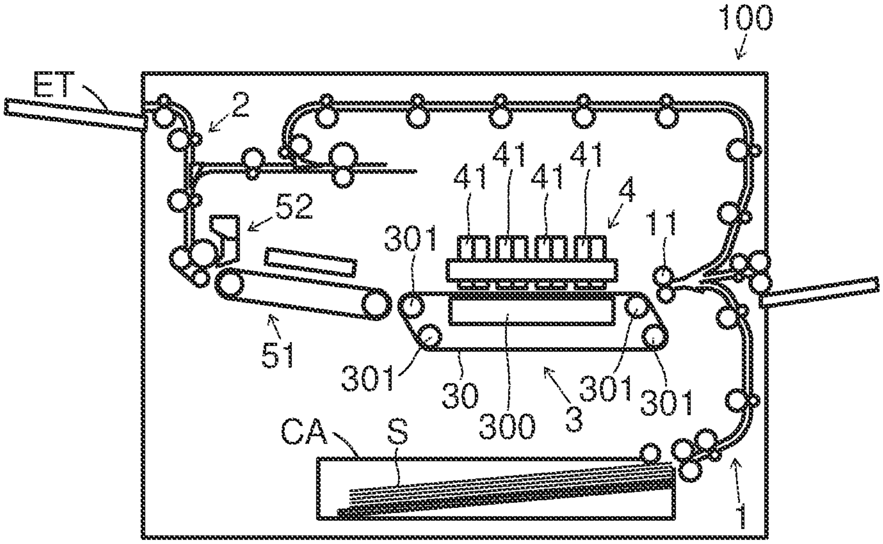
FIG. 1 is a schematic diagram of an ink-jet recording apparatus according to one embodiment.

As shown in FIG. 1, a printer 100 according to an embodiment includes a first conveying portion 1 and a second conveying portion 2. The first conveying portion 1 feeds out a sheet S set in a sheet feeding cassette CA to convey it to a printing position. In a print job by the printer 100, printing is performed on the sheet S passing across the printing position. The second conveying portion 2 conveys the printed sheet S and discharges it onto a discharge tray ET.

Although not illustrated, for example, a plurality of sheet feeding cassettes CA are mounted in the printer 100. The sheets S set in the plurality of sheet feeding cassettes CA may be in the same size or in different sizes. In a print job by the printer 100, of the plurality of sheet feeding cassettes CA, the one in which the sheet S to be used in the print job is set as a sheet supply source, and the sheet S is fed from the sheet feeding cassette CA that is set as the sheet supply source.

The first conveying portion 1 includes a plurality of conveying roller members including a pair of registration rollers 11 (corresponding to a "registration portion"). The plurality of conveying roller members rotate to convey the sheet S.

The pair of registration rollers 11 conveys the sheet S at a position on the upstream side, in the conveying direction, of the position where a conveying belt 30, which will be described later, is provided. In the following description, a conveyance position of the sheet S by the pair of registration rollers 11 (the position where the pair of registration rollers 11 is provided) is referred to as a registration position. The pair of registration rollers 11 is configured as a pair of rollers that are kept in pressed contact with each other. A registration nip is formed between the pair of rollers.

The sheet S fed from the sheet feeding cassette CA passes through the registration nip. The pair of registration rollers

11 rotates to convey the sheet S that passes through the registration nip toward a belt conveying portion 3, which will be described later.

The pair of registration rollers 11 is not rotating when the front end of the sheet S reaches the registration nip (registration position). At this point, the conveying roller members on the upstream side of the pair of registration rollers 11 in the sheet conveying direction are rotating. This helps correct a skew of the sheet S.

The printer 100 includes the belt conveying portion 3. The belt conveying portion 3 receives the sheet S from the first conveying portion 1 and conveys it. The belt conveying portion 3 includes a conveying belt 30. The conveying belt 30 is endless and is supported so as to be able to move around. The belt conveying portion 3 includes a plurality of stretching rollers 301. The plurality of stretching rollers 301 are rotatably supported. The conveying belt 30 is stretched around the plurality of stretching rollers 301 and moves around.

One of the plurality of stretching rollers 301 is coupled to a belt motor (not shown) and rotates by receiving a driving force from the belt motor. When the stretching roller 301 coupled to the belt motor rotates, the conveying belt 30 moves around and the other stretching rollers 301 rotate by following it.

The belt conveying portion 3 includes a suction unit 300. The suction unit 300 is arranged at the inner side of the conveying belt 30. In the conveying belt 30, a plurality of suction holes (not shown) that penetrate it in its thickness direction are formed.

The sheet S conveyed from the first conveying portion 1 reaches the outer circumferential face of the conveying belt 30. The suction unit 300 sucks the sheet S through the suction holes. The sheet S on the outer circumferential face of the conveying belt 30 is held by suction on the outer circumferential face of the conveying belt 30. The conveying belt 30 moves around with the sheet S held by suction on its outer circumferential face. The sheet S is thus conveyed.

In this way, the belt conveying portion 3 conveys the sheet S in the circulation direction of the conveying belt 30. That is, the circulation direction of the conveying belt 30 coincides with the conveying direction of the sheet S (the direction in which the sheet S advances).

The printer 100 includes a recording portion 4. The recording portion 4 is arranged opposite the outer circumferential face of the conveying belt 30. When the sheet S is held by suction on the outer circumferential face of the conveying belt 30, the sheet S and the recording portion 4 face each other across a gap left between them.

Figure 2:
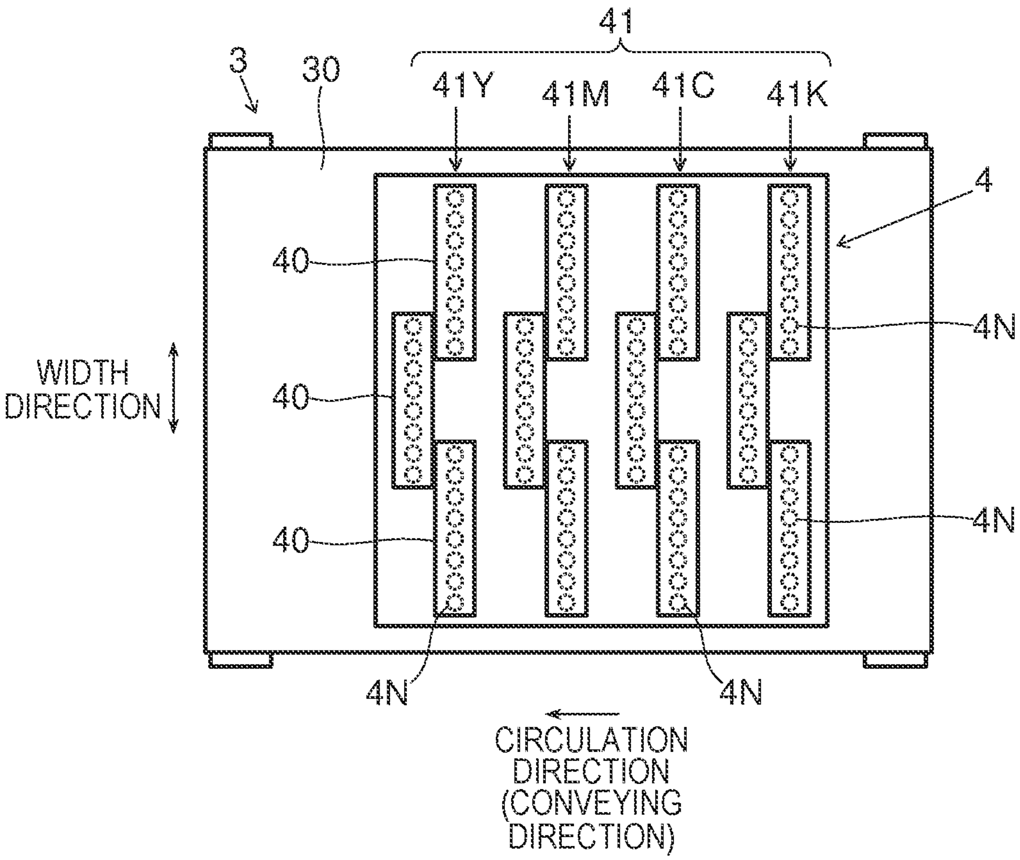
FIG. 2 is a plan view of a recording portion in the ink-jet recording apparatus according to the one embodiment.

As shown in FIG. 2, the recording portion 4 includes four line heads 41 corresponding to different colors, namely cyan, magenta, yellow, and black. In FIG. 2, the line heads 41 for cyan, magenta, yellow, and black are identified by the suffixes "C", "M", "Y", and "K" respectively.

The line heads 41 for the different colors each include a plurality of (for example, three) recording heads 40. For example, the plurality of recording heads 40 for each color are arranged in a staggered formation in the direction perpendicular to the circulation direction of the conveying belt 30 (the conveying direction of the sheet S). In the following description, the direction perpendicular to the circulation direction of the conveying belt 30 is referred to simply as the "width direction".

The recording heads 40 are arranged opposite the outer circumferential face of the conveying belt 30 in the up-down direction across a gap left between them. In other words, the recording heads 40 are arranged at such a position as to face, in the up-down direction, the sheet S being conveyed by the conveying belt 30. Here, the up-down direction is the direction perpendicular to the circulation direction of the conveying belt 30 and also to the width direction.

The recording heads 40 each have a nozzle face that faces the conveying belt 30 (the sheet S on the conveying belt 30). The nozzle faces of the recording heads 40 have a plurality of nozzles 4N. The plurality of nozzles 4N in the recording heads 40 eject ink of different colors corresponding to the recording heads 40. For example, the recording heads 40 all have the same number of nozzles 4N. The plurality of nozzles 4N in the recording heads 40 are arranged along the width direction of the conveying belt 30. In FIG. 2, the nozzles 4N are indicated by broken lines. In reality, the recording heads 40 have a larger number of nozzles 4N.

The recording portion 4 (recording heads 40), based on image data to be printed in a print job, ejects ink from the nozzles 4N toward the sheet S. The ink ejected from the recording portion 4 attaches to the sheet S. An image is thus printed to the sheet S. That is, the position between the conveying belt 30 and the recording heads 40 is the printing position. In other words, the position that faces the nozzle faces (nozzles 4N) of the recording heads 40 in the up-down direction is the printing position.

Here, out of the plurality of nozzles 4N, in the nozzles 4N which eject ink less often, the viscosity of ink increases over time. This results in nozzle clogging and degraded image quality. To suppress such inconveniences, the recording heads 40 perform flushing processing. In flushing processing by the recording heads 40, ink stagnant in the nozzles 4N is discharged. Nozzle clogging is thus suppressed. This will be described in detail later.

Back in FIG. 1, the printer 100 includes a drying unit 51 and a decurler 52. The drying unit 51 dries the ink attached to the sheet S being conveyed while conveying the sheet S toward the decurler 52. The decurler 52 corrects the curl of the sheet S. The decurler 52 conveys the decurled sheet S toward the second conveying portion 2.

Figure 3:
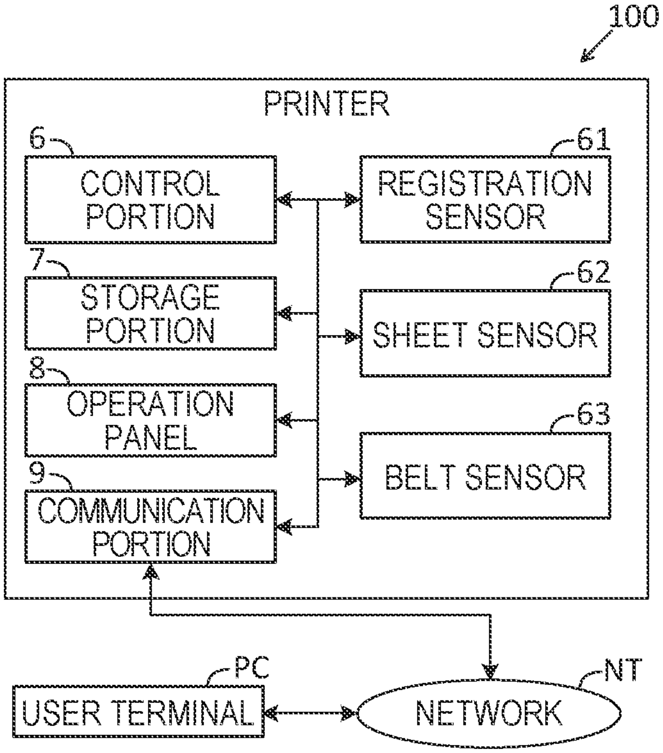
FIG. 3 is a block diagram of the ink-jet recording apparatus according to the one embodiment.

As shown in FIG. 3, the printer 100 includes a control portion 6. The control portion 6 controls the print job performed in the printer 100. The printer control portion 6 The control portion 6 controls the print job performed on the printer 100. In other words, the control portion 6 controls the operation of the first and second conveying portions 1 and 2, the belt conveying portion 3, the recording portion 4, the drying unit 51, and the decurler 52. In yet other words, the control portion 6 controls the conveyance of the sheet S and the ejection of ink by the recording heads 40. The control portion 6, as control related to conveyance of the sheet S, controls conveyance of the sheet S to the conveying belt 30 by the pair of registration rollers 11 to adjust the sheet-to-sheet distance, which is an interval between the sheet S conveyed (fed) previously and the sheet S to be conveyed (fed) next. The control portion 6 also controls flushing processing by the recording heads 40.

Figure 4:
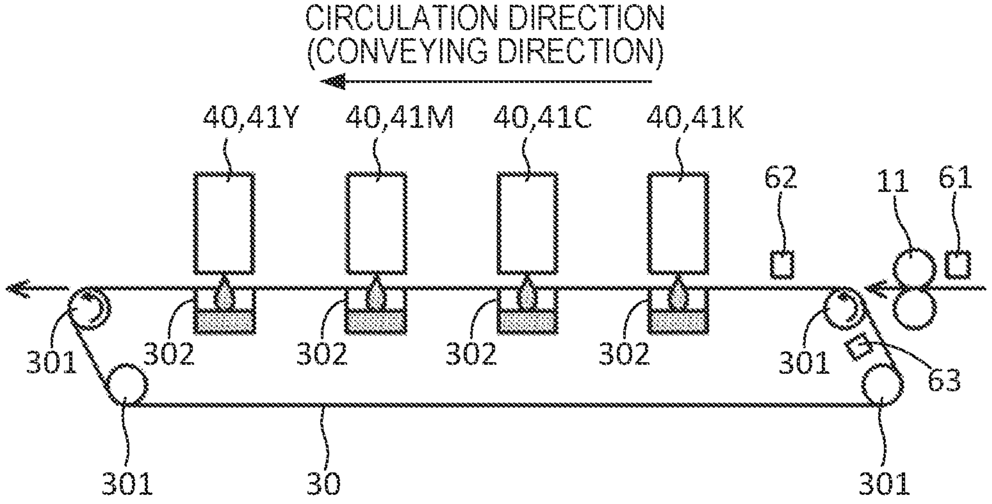
FIG. 4 is a schematic diagram of and around a conveying belt in the ink-jet recording apparatus according to the one embodiment.

To the control portion 6, a registration sensor 61, a sheet sensor 62, and a belt sensor 63 are connected. The sensing positions (arranged positions) of the registration sensor 61, the sheet sensor 62, and the belt sensor 63 are schematically shown in FIG. 4.

The sensing position of the registration sensor 61 is a position on the upstream side of the registration nip (registration position) in the sheet conveying direction. The registration sensor 61 is, for example, an optical sensor of a reflective or transmissive type. The registration sensor 61 changes its output value according to whether or not the sheet S is present at the corresponding sensing position.

Based on the output value of the registration sensor 61, the control portion 6 senses arrival of the leading edge, and passage of the trailing edge, of the sheet S at the sensing position of the registration sensor 61. In other words, based on the output value of the registration sensor 61, the control portion 6 senses arrival of the leading edge, and passage of the trailing edge, of the sheet S at the registration nip (registration position). Based on the elapsed time since the arrival of the leading edge of the sheet S at the sensing position of the registration sensor 61, the control portion 6 adjusts the timing at which the pair of registration rollers 11 starts conveying the sheet S (the timing at which the pair of registration rollers 11 starts rotating). Even if the sheet S is skewed, its conveyance by the pair of registration rollers 11 is started with the skew corrected.

The sensing position of the sheet sensor 62 is a position between the registration nip (registration position) and the printing position of, of the plurality of line heads 41, the line head 41 at the most upstream side in the sheet conveying direction. The sheet sensor 62 changes its output value according to whether or not the sheet S is present at the corresponding sensing position. As the sheet sensor 62, a CIS (contact image sensor) or an optical sensor of a reflective or transmissive type may be used. For example, a CIS is used as the sheet sensor 62.

Based on the output value of the sheet sensor 62, the control portion 6 senses arrival of the leading edge, and passage of the trailing edge, of the sheet S at the sensing position of the sheet sensor 62. Based on the output value of the sheet sensor 62, the control portion 6 adjusts the timing at which to eject ink to the sheet S conveyed by the conveying belt 30. The control portion 6 may instead adjust the timing at which to eject ink to the sheet S conveyed by the conveying belt 30 based on the elapsed time since the start of the conveyance of the sheet S by the pair of registration rollers 11.

The control portion 6 measures the sheet passage time after the arrival of the leading edge of the sheet S at the sensing position of the sheet sensor 62 until the passage of the trailing edge of the sheet S at the sensing position of the sheet sensor 62. The control portion 6 measures the sheet passing time after the leading edge of the sheet S has reached the sensing position of the sheet sensor 62 until the trailing edge of the sheet S has passed the sensing position of the sheet sensor 62. The sheet passage time at the sensing position of the sheet sensor 62 changes depending on the size of the sheet S in the conveying direction. Thus, the control portion 6, based on the sheet passage time, recognizes the size, in the conveying direction, of the sheet S conveyed by the conveying belt 30. In this way, even if the sheet S conveyed by the conveying belt 30 is of an irregular size, it is possible to make the control portion 6 recognize the size of the sheet S in the conveying direction.

Furthermore, the control portion 6 senses the deviation (skew) of the sheet S based on the output value of the sheet sensor 62 (read data obtained through reading by the sheet sensor 62). For example, after the conveyance of the sheet S by the pair of registration rollers 11 is started, the sheet S may deviate. In this case, the deviation of the sheet S is sensed by the control portion 6.

It is also possible to provide a plurality of sheet sensors 62. For example, two sheet sensors 62 may be provided.

The belt sensor 63 is a sensor for sensing a prescribed reference position (home position) of the conveying belt 30. The reference position of the conveying belt 30 is indicated by a predetermined mark. This allows the reference position of the conveying belt 30 to be sensed based on the output value of the belt sensor 63. For example, a CIS is used as the belt sensor 63. The belt sensor 63 may be configured using an optical sensor of a transmissive or reflective type.

The control portion 6 senses the reference position of the conveying belt 30 based on the output value of the belt sensor 63. In other words, the control portion 6 senses the position of a flushing area 31 (openings 310), which will be described later, in the circulation direction based on the output value of the belt sensor 63.

As shown in FIG. 3, the printer 100 includes a storage portion 7. The storage portion 7 includes storage devices such as a ROM, a RAM, an HDD, and an SSD. The storage portion 7 is connected to the control portion 6. The control portion 6 reads information from the storage portion 7. The control portion 6 writes information to the storage portion 7.

The printer 100 includes an operation panel 8. The operation panel 8 includes, for example, a touch screen. The touch screen displays software buttons, messages, etc., and accepts touch operations by a user. The operation panel 8 also includes hardware buttons for accepting settings, instructions, etc. The operation panel 8 is connected to the control portion 6. The control portion 6 controls display operation on the operation panel 8 (touch screen). The control portion 6 senses operations performed on the operation panel 8.

The printer 100 includes a communication portion 9. The communication portion 9 includes a communication circuit, etc. The communication portion 9 is connected to a user terminal PC via a network NT. The user terminal PC is an information processing apparatus such as a personal computer. The control portion 6 communicates with the user terminal PC using the communication portion 9. For example, print data (data including PDL data, etc.) for a print job transmitted to the printer 100 from the user terminal PC. In other words, a request to execute a print job is transmitted from the user terminal PC to the printer 100. Print data for a print job includes various types of setting data related to printing, such as the size of the sheet S to be used in the print job.

<Configuration of the Conveying Belt>

Figure 5:
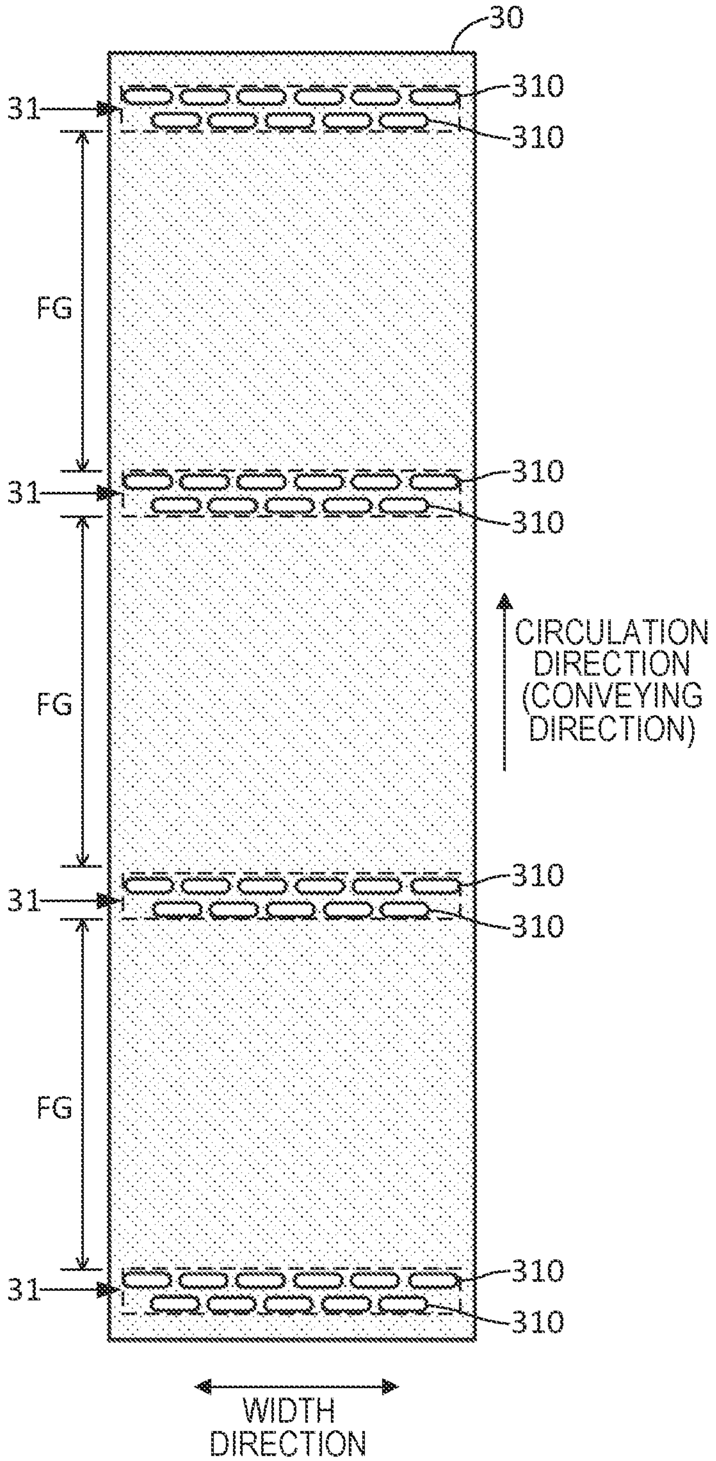
FIG. 5 is a plan view of the conveying belt in the ink-jet recording apparatus according to the one embodiment.

As shown in FIG. 5, the conveying belt 30 includes a flushing area 31. In FIG. 5, the flushing area 31 is enclosed by broken lines. The flushing area 31 is an area where openings 310 are formed that penetrate the conveying belt 30 in its thickness direction. In flushing processing, ink is ejected from the recording heads 40, and the ejected ink passes through the openings 310 to reach a receiving part 302 (see FIG. 4) arranged at the inner side of the conveying belt 30. The ink in the receiving part 302 is collected and discarded.

The conveying belt 30 has a plurality of flushing areas 31. The plurality of flushing areas 31 are arranged at predetermined intervals FG from each other in the circulation direction of the conveying belt 30.

Each flushing area 31 has a plurality of (the same number of) openings 310. The openings 310 are each an elongate hole extending in the width direction of the conveying belt 30. There is no particular limitation on the shape of the openings 310 (the shape as seen from the thickness direction of the conveying belt 30). It may be in a rectangular shape, circular shape, elliptical shape, or oval shape.

For example, each flushing area 31 includes two rows of openings. Each row of openings is a row of openings 310 that are arrayed at equal intervals in the width direction of the conveying belt 30. One row of openings has six openings 310, and the other row of openings has five openings 310. The middle of the rows of openings in the width direction coincides with the middle of the conveying belt 30 in the width direction. That is, the plurality of openings 310 in each flushing area 31 are arranged in a staggered formation in the width direction. Here, the length of the openings 310 in the width direction (i.e., opening width) is larger than the distance between two consecutive openings 310 in the width direction.

Figure 6:
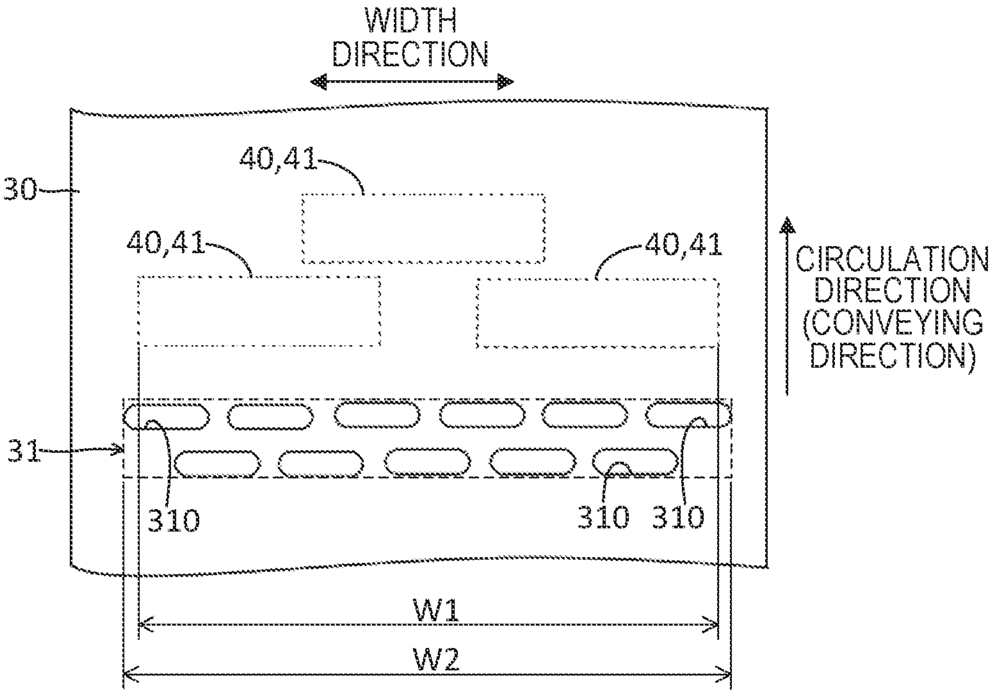
FIG. 6 is a diagram showing the positional relationship between a flushing area of the conveying belt and recording heads in the ink-jet recording apparatus according to the one embodiment.

As shown in FIG. 6, a width W1 (mm) is smaller than a width W2 (mm). The width W1 corresponds to the length of the line head 41 in the width direction. Specifically, the width W1 corresponds to the length in the width direction from an end, at one side, of the recording head 40 located at the one side in the width direction to an end, at the other side, of the recording head 40 located at the other side in the width direction. The width W2 corresponds to the length of the flushing area 31 in the width direction. Specifically, the width W2 corresponds to the length in the width direction from an end, at one side, of the opening 310 located farthest to the one side in the width direction to an end, at the other side, of the opening 310 located farthest to the other side in the width direction.

Thus, as the conveying belt 30 is circulated, it is possible to make each of the plurality of nozzles 4N in each recording head 40 face at least one of the openings 310 in the up-down direction. When, in flushing processing, ink that does not contribute to printing is ejected from each of the nozzles 4N, it is possible to control such that the ink passes through the openings 310 (such that the ink does not attach to the conveying belt 30 and to the sheet S).

<Conveyance of the Sheet>

In printing on a plurality of sheets S of the same size conveyed sequentially by the conveying belt 30, the control portion 6 controls such that the sheet-to-sheet distance, that is, the interval between the trailing edge of the foregoing sheet S and the leading edge of the subsequent sheet S (the sheet S conveyed after the foregoing sheet S) in the conveying direction (the dimension, in the conveying direction, of the region between the trailing edge of the foregoing sheet S and the leading edge of the subsequent sheet S) remains constant. That is, in this case, the control portion 6 controls such that a plurality of sheets S are conveyed at a constant interval (such that the sheet-to-sheet distance among the plurality of sheets S is constant). Successive printing on a plurality of sheets S of the same size conveyed sequentially at an interval by the conveying belt 30 corresponds to “successive printing”, and will hereinafter be referred to simply as “successive printing”.

Here, during successive printing, flushing processing is performed in the recording heads 40. The control portion 6 controls the flushing processing by the recording heads 40. The ink ejected in flushing processing does not contribute to printing. Thus, the control portion 6 controls such that the ink ejected in flushing processing passes through the openings 310. That is, the control portion 6 makes the nozzles 4N eject ink at a timing at which they face the openings 310 that do not overlap the sheet S.

To perform such control, the control portion 6 checks the size of the sheet S conveyed by the conveying belt 30. The control portion 6 also senses the reference position of the conveying belt 30. Then, the control portion 6 adjusts the timing at which to start conveying the sheet S from the pair of registration rollers 11 to the conveying belt 30 so that the flushing areas 31 appear within the intervals of the sheets at a prescribed cycle. In other words, the control portion 6 controls conveyance of the sheet to the conveying belt 30 by the pair of registration rollers 11 to adjust the sheet-to-sheet distance between the foregoing sheet S and the subsequent sheet S. The control portion 6 changes the timing at which to start conveying the sheet S from the pair of registration rollers 11 to the conveying belt 30 according to the size of the sheet S conveyed by the conveying belt 30. Before performing a print job, the control portion 6 checks the size of the sheet S to be used in the print job (the sheet S to be conveyed by the conveying belt 30) based on print data for the print job to be performed.

Figure 7:
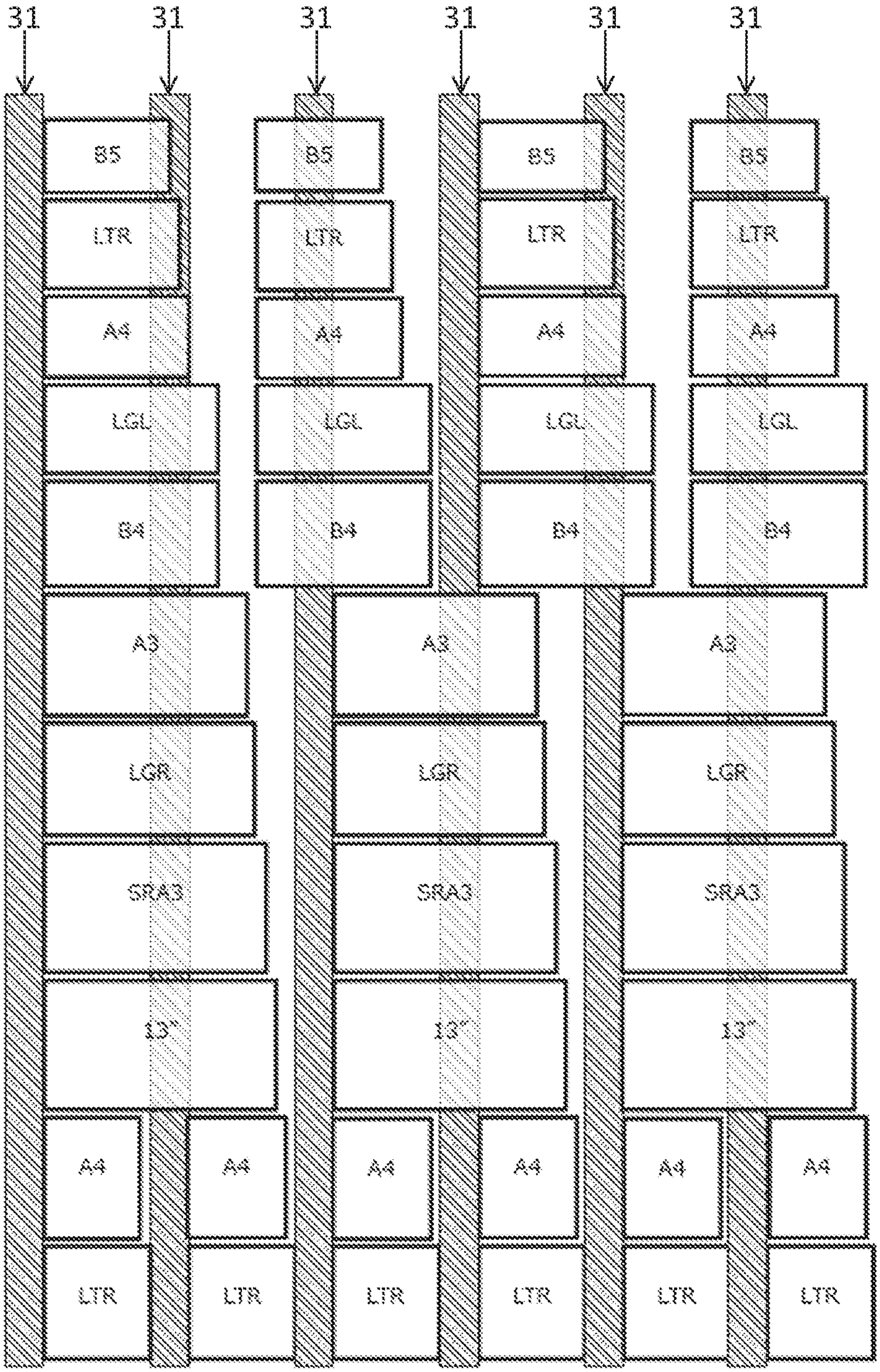
FIG. 7 is a diagram showing the positional relationship between the flushing areas of the conveying belt and sheets in the ink-jet recording apparatus according to the one embodiment.

The positional relationship between the sheets S conveyed by the conveying belt 30 and the flushing areas 31 is shown in FIG. 7. The circulation direction of the conveying belt 30 (the conveying direction of the sheet S) in FIG. 7 is the direction from right to left on the plane of FIG. 7. In FIG. 7, the flushing areas 31 are indicated by hatching, and the openings 310 are omitted. In FIG. 7, instead of the reference sign for the sheet S, the size of each sheet S is marked in the outline representing the sheet S. In FIG. 7, for the sake of convenience, a plurality of sheets S of different sizes are illustrated all together.

Figure 8:
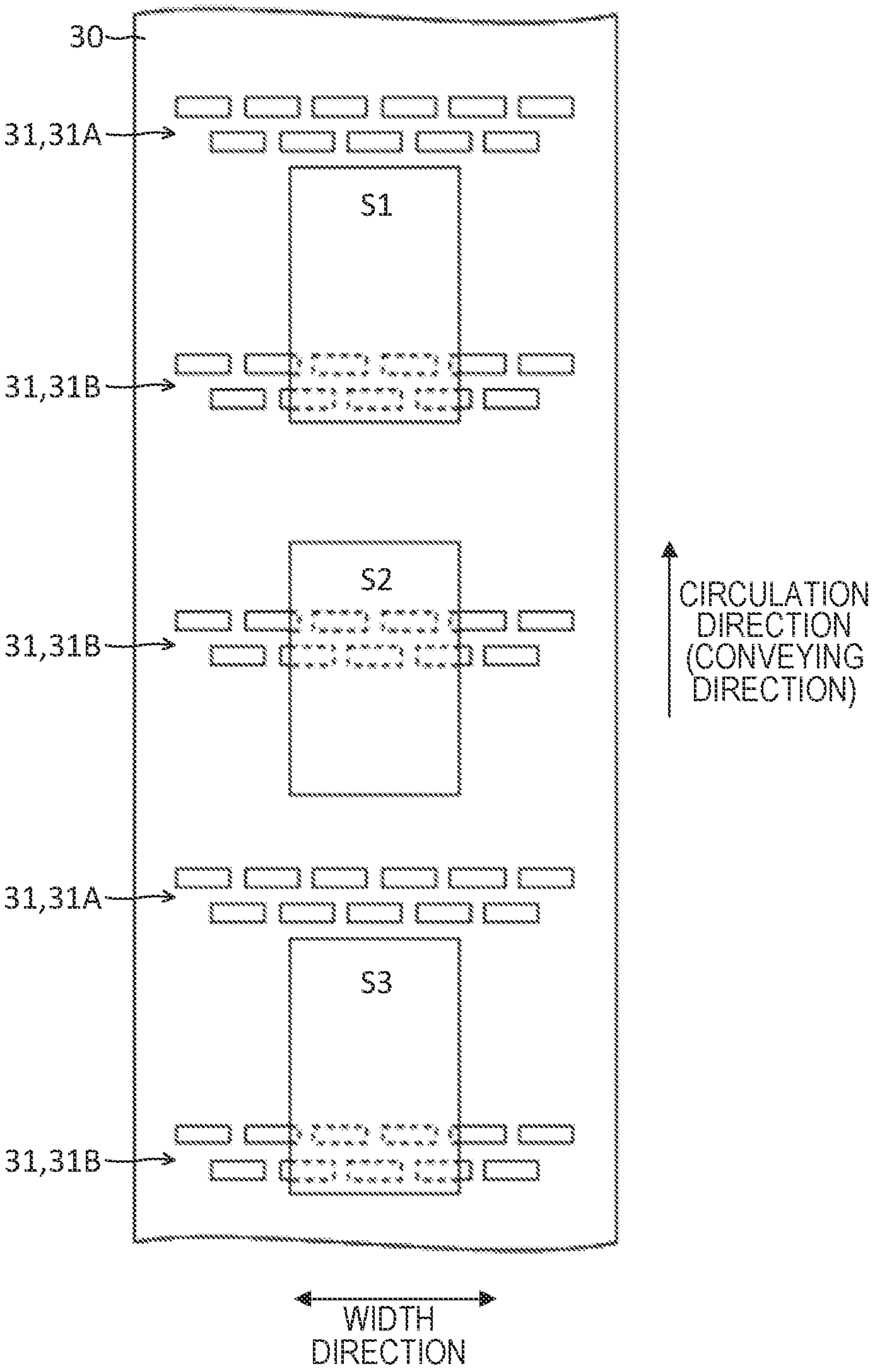
FIG. 8 is a diagram showing a state where sheets are being conveyed (a state where sheets of A4 portrait size are conveyed) by the conveying belt in the ink-jet recording apparatus according to the one embodiment.

Now, with reference to FIG. 8, a detailed description will be given with focus on A4 portrait size. The circulation direction of the conveying belt 30 (the conveying direction of the sheet S) in FIG. 8 is the direction from bottom to top on the plane of FIG. 8. In FIG. 8, for the sake of convenience, three sheets S are shown, and they are identified by the suffixes 1 to 3 indicating the order of conveyance.

When the size of the sheet S is A4 portrait, no flushing area 31 appears between the first and second sheets S1 and S2. A flushing area 31 appears between the second and third sheets S2 and S3. The flushing area 31 between the sheets S2 and S3 does not overlap either the sheet S2 or S3 at all. Although not shown, no flushing area 31 appears between the third sheet S3 and the fourth sheet S, and a flushing area 31 appears between the fourth and fifth sheets S.

<Flushing Processing>

Hereinafter, how the flushing processing by each recording head 40 is controlled will be described with focus on one recording head 40. The other recording heads 40 are controlled similarly to the one recording head 40. Thus, for the control of the other recording heads 40, no overlapping description will be repeated.

The control portion 6 sets, as a control period for flushing processing in successive printing, the period after the arrival, at the printing position of the recording head 40 (the position opposite the recording head 40), of the leading edge of the sheet S to be printed first (the first sheet S) in successive printing on a plurality of sheets S of the same size until the passage, at the printing position of the recording head 40 (the position opposite the recording head 40), of the sheet S to be printed last (the last sheet S) in successive printing. In an example shown in FIG. 8, suppose that the first sheet in successive printing is the sheet S1, then the time point at which the leading edge of the sheet S1 arrives at the printing position of the recording head 40 is the start point of the control period.

When, during successive printing (during control period for flushing processing), a flushing area 31 that does not overlap the sheet S at all faces the recording head 40, the control portion 6 makes the recording head 40 perform flushing processing. The control portion 6, every time a flushing area 31 that does not overlap the sheet S at all faces the recording head 40, makes the recording head 40 perform, as flushing processing, processing in which ink is ejected from the nozzles 4N toward the openings 310. By contrast, even when, during successive printing, a flushing area 31 that at least in a part of it overlaps the sheet S faces the recording head 40, the control portion 6 makes the recording head 40 perform no flushing processing. This will now be described specifically.

In the following description, a flushing area 31 that does not overlap the sheet S at all is identified by a suffix "A" and is referred to as a non-overlapping flushing area 31A, and a flushing area 31 that at least in a part of it overlaps the sheet S is identified by a suffix "B" and is referred to as an overlapping flushing area 31B. The plurality of flushing areas 31 are each classified into either of a non-overlapping flushing area 31A or an overlapping flushing area 31B.

To control flushing processing by the recording head 40, the control portion 6 senses the reference position of the conveying belt 30 (sense the position of a flushing area 31 in the circulation direction). The control portion 6 also recognizes the position, on the conveying belt 30, of the sheet S conveyed from the pair of registration rollers 11 to the conveying belt 30. For example, the control portion 6, by sensing arrival of the leading edge of the sheet S at the sensing position of the sheet sensor 62, recognizes the position, on the conveying belt 30, of the sheet S conveyed from the pair of registration rollers 11 to the conveying belt 30. For example, the control portion 6, based on read data by the sheet sensor 62 (CIS), recognizes the position, on the conveying belt 30, of the sheet S conveyed from the pair of registration rollers 11 to the conveying belt 30. For example, the control portion 6, based on the elapsed time since conveyance of the sheet S by the pair of registration rollers 11 has started, recognizes the position of the sheet S on the conveying belt 30.

The control portion 6, based on the reference position of the conveying belt 30 (the position of a flushing area 31 in the circulation direction) and the position of the sheet S on the conveying belt 30, recognizes the positional relationship between the sheet S on the conveying belt 30 and the flushing area 31. Then, the control portion 6 recognizes a flushing area 31 that does not overlap the sheet S at all as a non-overlapping flushing area 31A and a flushing area 31 that at least in a part of it overlaps the sheet S as an overlapping flushing area 31B.

In an example shown in FIG. 8, the first and fourth flushing areas 31 are recognized as non-overlapping flushing areas 31A and the second, third, and fifth flushing areas 31 as overlapping flushing areas 31B.

Non-overlapping flushing areas 31A appear within the intervals of the sheets. However, a non-overlapping flushing area 31A does not appear within every interval of the sheets. Depending on the size of the sheet S in the conveying direction, a non-overlapping flushing area 31A appears within every interval of the sheets. Depending on the size of the sheet S in the conveying direction, all the flushing areas 31 are non-overlapping flushing areas 31A. It never occurs that all the flushing areas 31 are overlapping flushing areas 31B.

When the sheets S used in successive printing is of a regular size (e.g. A4 size), as shown in FIG. 7, conveyance of the sheets S is controlled such that the positional relationship between the sheets S and flushing areas 31 has a prescribed pattern. The pattern of the positional relationship between the sheets S and flushing areas 31 is prescribed for each size of the sheets S. The control portion 6 recognizes the pattern corresponding to the size of the sheets S used in successive printing and controls conveyance of the sheets S such that the positional relationship between the sheets S and flushing areas 31 has that pattern. Thus, when the sheets S used in successive printing are of a regular size, under ideal conditions, the positional relationship between the sheets S and flushing areas 31 is as shown in FIG. 7.

In the example shown in FIG. 8, that is, in the case of A4 portrait size, every other time an overlapping flushing area 31B passes by the printing position of the recording head 40 twice consecutively, a non-overlapping flushing area 31A reaches the printing position of the recording head 40 once. In other words, a cycles is repeated in which, after an overlapping flushing area 31B passes by the printing position of the recording head 40 twice consecutively, a non-overlapping flushing area 31A reaches the printing position of the recording head 40. Thus, in the case of A4 portrait size, while a flushing area 31 passes by the printing position of the recording head 40 three times, one session of flushing processing is performed.

As another example, in the case of A4 landscape size (the second size from the bottom of FIG. 7), all flushing areas 31 are non-overlapping flushing areas 31A. Thus, in the case of A4 landscape size, every time a flushing area 31 reaches the printing position of the recording head 40, one session of flushing processing is performed.

In this way, depending on the size of the sheets S in the conveying direction, the frequency at which non-overlapping flushing areas 31A appear changes. That is, depending on the size of the sheets S in the conveying direction, the number of times a non-overlapping flushing area 31A passes by the printing position of the recording head 40 (that is, the number of times an overlapping flushing area 31B passes by the recording head 40) changes.

Thus, when, for example, the number of sheets to be printed in successive printing using sheets S of A4 portrait size is the same as that using sheets S of A4 landscape size, in successive printing using sheets S of A4 portrait size, the number of sessions of flushing processing performed during the successive printing is smaller than in successive printing using sheets S of A4 landscape size. In other words, in successive printing using sheets S of A4 portrait size, the period between a session of flushing processing performed at a given timing and its subsequent session is longer than that in successive printing using sheets S of A4 landscape size.

If the amount of ink ejected by each of the nozzles 4N in one session of flushing processing using sheets S of A4 portrait size is the same as that using sheets S of A4 landscape size, when sheets S of A4 portrait size are used, the total amount of ink ejected by each of the nozzles 4N in flushing processing is smaller than when sheets S of A4 landscape size are used. Thus, during successive printing, ink ejection failure (clogging in the nozzles 4N) due to increased viscosity of the ink in the nozzles 4N is more likely to occur. The longer the period between a session of flushing processing performed at a given timing and its subsequent session (the period during which no flushing processing is performed), the more likely the ink in the nozzles 4N is to dehydrate (increased viscosity may make ejection failure more likely).

Thus, when, during successive printing, the control portion 6 makes the recording head 40 perform flushing processing, the longer a non-flashing period between the previous and present sessions of flushing processing (the period during which no flushing processing is performed), the larger the control portion 6 makes the amount of ink ejected by each of the nozzles 4N in the present session of flushing processing. That is, when, during successive printing, the control portion 6 makes the recording head 40 perform flushing processing, the larger the number of times an overlapping flushing area 31B passes by the printing position of the recording head 40 (the position opposite the recording head 40) during the non-flashing period between the previous and present sessions of flushing processing, the larger the control portion 6 makes the amount of ink ejected by each of the nozzles 4N in the present session of flushing processing.

Now, the amount of ink ejected in flushing processing will be described taking as an example a case where sheets S of a first size are used and a case where sheets S of a second size are used.

Here, the first size is a reference size. The reference size is equal to or shorter than the length corresponding to the predetermined interval FG shown in FIG. 5. For example, the reference size corresponds to the length of a sheet S of A4 landscape size in the conveying direction (the circulation direction of the conveying belt 30).

By contrast, the second size is larger than the length corresponding to the predetermined interval FG shown in FIG. 5. Thus, when a sheet S of the second size is used, it is not possible to arrange the sheet S within the range between two consecutive flushing areas 31 in the circulation direction of the conveying belt 30. In other words, it is not possible to arrange the sheet S without any part of it lying outside the range. Thus, when sheets S of the second size are used, each sheet S always overlaps one flushing area 31.

When sheets S of the first size (reference size) are used in successive printing, the control portion 6 makes the pair of registration rollers 11 convey the sheets S from the registration position to the conveying belt 30 at such timings that a flushing area 31 appears, without overlapping the sheets S, within every sheet-to-sheet interval between a plurality of sheets S conveyed in successive printing. Thus, when the size of sheets S, in the conveying direction, used in successive printing is the first size, all flushing areas 31 are non-overlapping flushing areas 31A and no overlapping flushing area 31B appears.

When sheets S of the first size are used in successive printing, the control portion 6 sets the amount of ink ejected by each of the nozzles 4N in one session of flushing processing at a prescribed reference amount. That is, the control portion 6, when the recording head 40 faces a non-overlapping flushing area 31A, makes the recording head 40 perform, as one session of flushing processing, processing in which a reference amount of ink is ejected from each of the nozzles 4N.

For example, the amount of ink ejected by each of the nozzles 4N becomes equal to the reference amount when ink ejection is performed a prescribed reference number of times (ink ejection for a predetermined number of lines is performed). Thus, when sheets S of the first size are used in successive printing, the control portion 6 makes each of the nozzles 4N perform ink ejection the reference number of times in one session of flushing processing.

Here, when, during successive printing, the control portion 6 makes the recording head 40 perform flushing processing, if an overlapping flushing area 31B has appeared during a non-flashing period between the previous and present sessions of flushing processing, the control portion 6 makes the amount of ink ejected by each of the nozzles 4N in the present session of flushing processing larger than the reference amount. If no overlapping flushing area 31B has appeared during the non-flashing period, the control portion 6 sets the amount of ink ejected by each of the nozzles 4N in the present session of flushing processing at the reference amount.

When the size of sheets S used in successive printing is the first size (reference size), no overlapping flushing area 31B appears. Thus, the amount of ink ejected by each of the nozzles 4N in flushing processing is always set at the reference amount (the amount of ink ejected is small). Here, if the size of sheets S used in successive printing is the first size, all flushing areas 31 are non-overlapping flushing areas 31A; thus, every time a flushing area 31 passes by the printing position of the recording head 40, flushing processing is performed.

By contrast, when the size of sheets S used in successive printing is the second size, both non-overlapping flushing areas 31A and overlapping flushing areas 31B appear. That is, at least once in a non-flushing period, an overlapping flushing area 31B passes by the printing position of the recording head 40.

Figure 9:
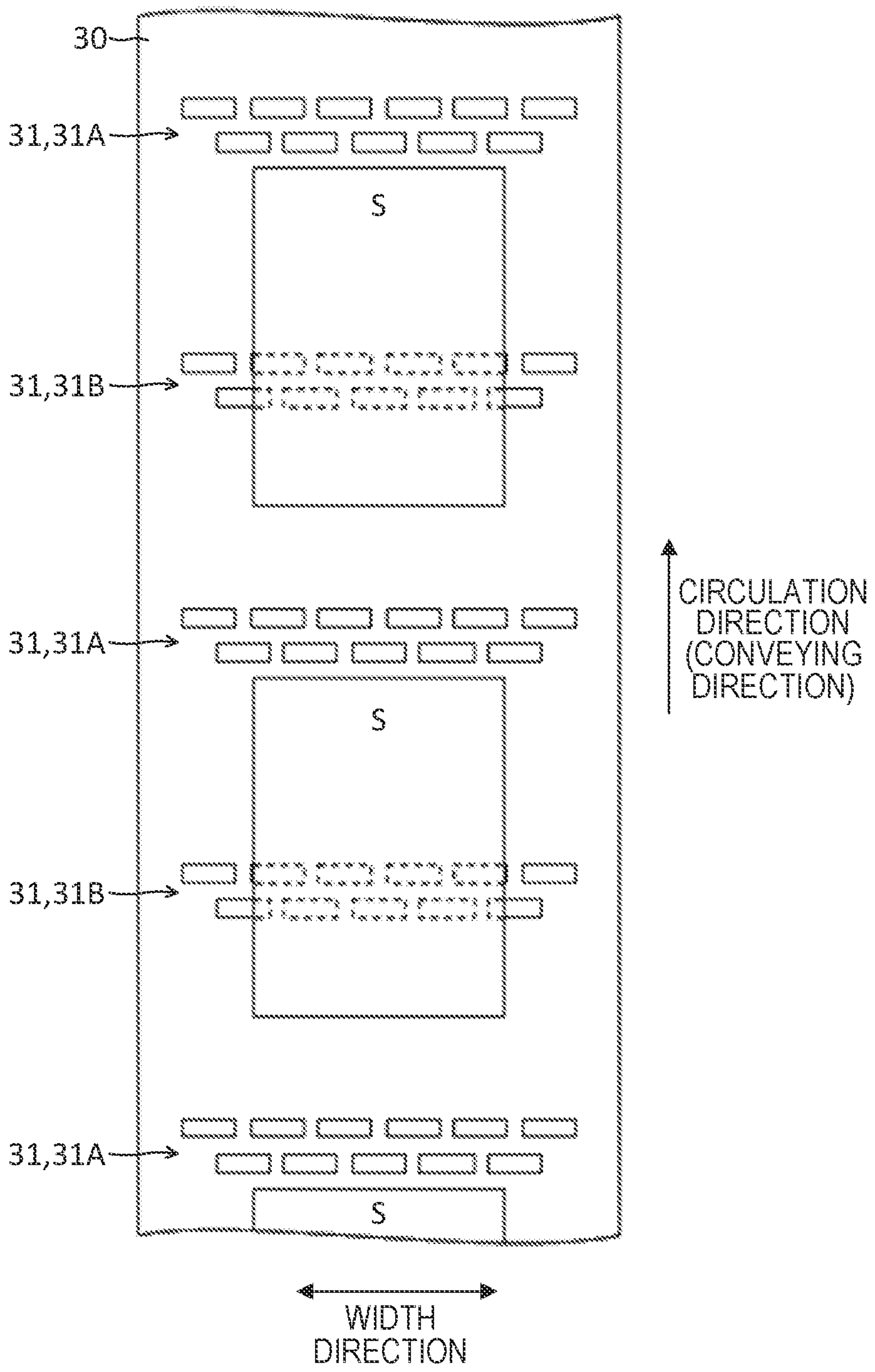
FIG. 9 is a diagram showing a state where sheets are being conveyed (a state where sheets of A3 size are conveyed) by the conveying belt in the ink-jet recording apparatus according to the one embodiment.

When the second size is A4 portrait size, as shown in FIG. 8, an overlapping flushing area 31B passes by the printing position of the recording head 40 twice in a non-flashing period. When the second size is A3 size, as shown in FIG. 9, an overlapping flushing area 31B passes by the printing position of the recording head 40 once in a non-flashing period. Thus, in the examples shown in FIGS. 8 and 9, the amount of ink ejected by each of the nozzles 4N in one session of flushing processing is larger than the reference amount.

The larger the number of times an overlapping flushing area 31B passes by the printing position of the recording head 40 in a non-flushing period, the longer the non-flushing period. The longer the non-flushing period, the more likely the ink in the nozzles 4N is to dehydrate. Thus, it is preferable to increase the amount of ink ejected by each of the nozzles 4N in one session of flushing processing as the number of times an overlapping flushing area 31B passes by the printing position of the recording head 40 in a non-flushing period increases.

Thus, when, during successive printing, the control portion 6 makes the recording head 40 perform flushing processing, the control portion 6, based on the number of times an overlapping flushing area 31B passes by the printing position of the recording head 40 in a non-flushing period, sets the amount of ink ejected by each of the nozzles 4N in the present session of flushing processing. The amount of ink ejected by each of the nozzles 4N in one session of flushing processing increases as the number of times an overlapping flushing area 31B passes by the printing position of the recording head 40 in a non-flashing period increases. That is, the longer a non-flashing period, the larger the amount of ink ejected by each of the nozzles 4N in one session of flushing processing.

Specifically, when the amount of ink ejected by each of the nozzles 4N in one session of flushing processing is set, the control portion 6 recognizes the number of times an overlapping flushing area 31B passes by the printing position of the recording head 40 during a non-flashing period between the previous and present sessions of flushing processing. The control portion 6 calculates an adjustment value by adding one to the recognized number of times of passage.

In the example shown in FIG. 8, an overlapping flushing area 31B passes by the printing position of the recording head 40 twice during a non-flashing period. Thus, the adjustment value is three (=2+1). In the example shown in FIG. 9, an overlapping flushing area 31B passes by the printing position of the recording head 40 once during a non-flashing period. Thus, the adjustment value is two (=1+1).

The control portion 6 calculates a number of times by multiplying the reference number of times by the adjustment value. Then, the control portion 6 sets the number of times of ink ejection by each of the nozzles 4N in the present session of flushing processing at the value calculated by multiplying the reference number of times by the adjustment value. By such a setting, the longer a non-flushing period (the larger the number of times an overlapping flushing area 31B passes by the printing position of the recording head 40 in a non-flushing period), the larger the number of times of ink ejection by each of the nozzles 4N in the present session of flushing processing. That is, the longer a non-flashing period, the larger the amount of ink ejected by each of the nozzles 4N in the present session of flushing processing.

Figure 10:
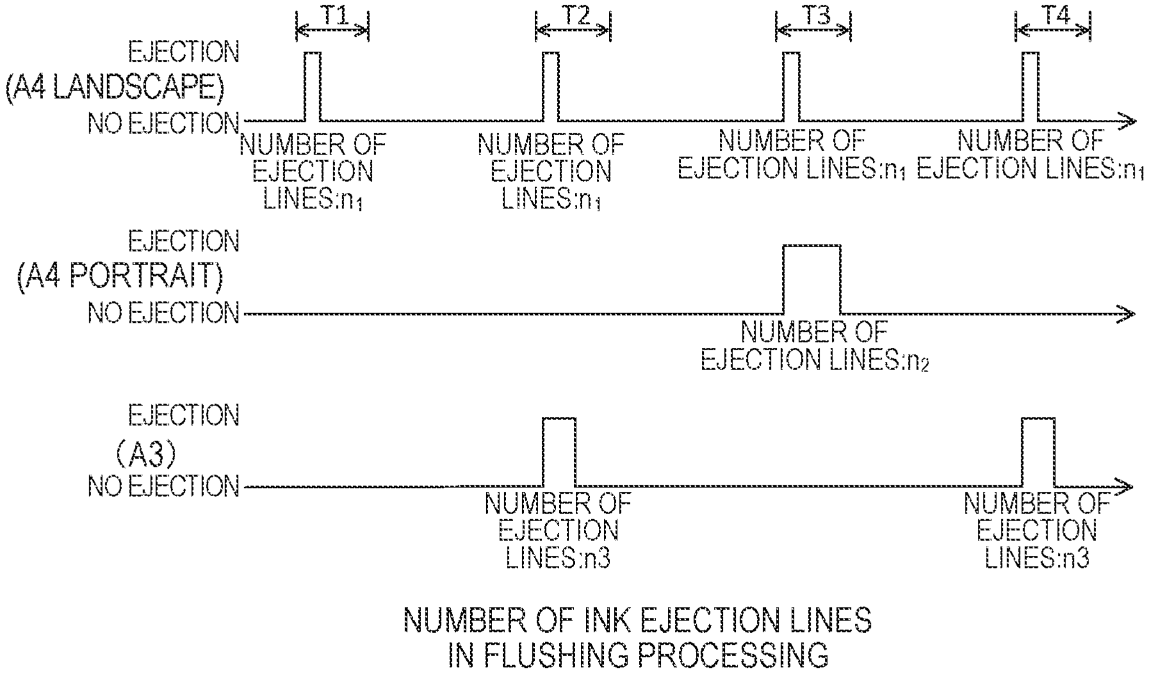
FIG. 10 is a diagram illustrating control of flushing processing performed in the ink-jet recording apparatus according to the one embodiment.

One example of control of flushing processing is shown in FIG. 10. FIG. 10 shows control when sheets S of the first size (A4 landscape size) as the reference size are used, when sheets S of A4 portrait size as the second size are used, and when sheets S of A3 size as the second size are used.

In FIG. 10, periods T1, T2, T3, and T4 are periods during which a flushing area 31 faces the recording head 40. In other words, a flushing area 31 passes by the printing position of the recording head 40 during those periods. A non-overlapping flushing area 31A can pass by the printing position of the recording head 40 during those periods, or an overlapping flushing area 31B can pass by the printing position of the recording head 40 during those periods.

When sheets S are of A4 landscape size, a non-overlapping flushing area 31A faces the recording head 40 in all the periods T1, T2, T3, and T4. Then, in all the periods T1, T2, T3, and T4, flushing processing is performed. In flushing processing in this case, the reference amount of ink is ejected from each of the nozzles 4N. That is, ink ejection is performed the reference number of times at each nozzles 4N. Here, suppose that each of the nozzles 4N ejects $n_1$ lines worth of ink (eject ink $n_1$ times). For example, $n_1$ equals 10. That is, the reference number of times is 10.

When sheets S are of A4 landscape size, no overlapping flushing area 31B passes by the printing position of the recording head 40 during a non-flashing period between the previous and present sessions of flushing processing (the number of times is zero). Thus, the adjustment value is one (=the number of times+1). The number of times calculated by multiplying the reference number of times (=10 times) by the adjustment value (=1) is 10 times. Thus, in flushing processing, each of the nozzles 4N ejects 10 lines worth of ink (ejects ink 10 times).

When sheets S are of A4 portrait size, an overlapping flushing area 31B passes by the printing position of the recording head 40 in the periods T1, T2, and T4. Then, in the period T3, a non-overlapping flushing area 31A faces the recording head 40. Thus, flushing processing is performed in the period T3. Here, suppose that each of the nozzles 4N ejects $n_2$ lines worth of ink (ejects ink $n_2$ times).

When sheets S are of A4 portrait size, an overlapping flushing area 31B passes by the printing position of the recording head 40 twice during a non-flashing period between the previous and present sessions of flushing processing (the number of times is two). Thus, the adjustment value is three (=the number of times+1). The number of times calculated by multiplying the reference number of times (=10 times) by the adjustment value (=3) is 30 times. Thus, in flushing processing, each of the nozzles 4N ejects 30 lines worth of ink (ejects ink 30 times). That is, $n_2$ equals 30.

When sheets S are of A3 size, an overlapping flushing area 31B passes by the printing position of the recording head 40 in the period T1. Then, in the subsequent period T2, a non-overlapping flushing area 31A faces the recording head 40 and flushing processing is performed. Here, suppose that each of the nozzles 4N ejects $n_3$ lines worth of ink (ejects ink $n_3$ times). In the subsequent period T3, an overlapping flushing area 31B passes by the printing position of the recording head 40. In the period T4, a non-overlapping flushing area 31A passes by the printing position of the recording head 40 (flushing processing for $n_3$ lines is performed).

When sheets S are of A3 size, an overlapping flushing area 31B passes by the printing position of the recording head 40 once during a non-flashing period between the previous and present sessions of flushing processing (the number of times is one). Thus, the adjustment value is two (=the number of times+1). The number of times calculated by multiplying the reference number of times (=10 times) by the adjustment value (=2) is 20. Thus, in flushing processing, each of the nozzles 4N ejects 20 lines worth of ink (ejects ink 20 times). That is, $n_3$ equals 20.

In this embodiment, as described above, when, during successive printing, the control portion 6 makes the recording head 40 perform flushing processing, the longer a non-flashing period between the previous and present sessions of flushing processing, the larger the control portion 6 makes the amount of ink ejected by each of the nozzles 4N in the present session of flushing processing. That is, the control portion 6 changes the amount of ink ejected by each of the nozzles 4N in one session of flushing processing in accordance with the size of sheets S, in the conveying direction, used in successive printing.

With this configuration, when it is possible to control such that a non-overlapping flushing area 31A appears within every sheet-to-sheet interval between a plurality of sheets S conveyed in successive printing (when a non-flashing period becomes the shortest), the amount of ink ejected by each of the nozzles 4N in one session of flushing processing is the smallest (reference amount). When it is not possible to control such that a non-overlapping flushing area 31A appears within every sheet-to-sheet interval between a plurality of sheets S conveyed in successive printing, the amount of ink ejected by each of the nozzles 4N in one session of flushing processing is larger than the reference amount.

When it is not possible to control such that a non-overlapping flushing area 31A appears within every sheet-to-sheet interval between a plurality of sheets S conveyed in successive printing, compared to a case where it is possible to control such that a non-overlapping flushing area 31A appears within every sheet-to-sheet interval between a plurality of sheets S conveyed in successive printing, the number of sessions of flushing processing per unit time is smaller; thus it is preferable to make the amount of ink ejected by each of the nozzles 4N in one session of flushing processing larger. In this way, it is possible to suppress dehydration of the ink in the nozzles 4N (clogging in the nozzles 4N). That is, it is possible to suppress degradation of image quality. By contrast, when it is possible to control such that a non-overlapping flushing area 31A appears within every sheet-to-sheet interval between a plurality of sheets S conveyed in successive printing, the number of sessions of flushing processing per unit time becomes the largest; thus it is possible to suppress dehydration of the ink in the nozzles 4N (clogging in the nozzles 4N) even when the amount of ink ejected by each of the nozzles 4N in one session of flushing processing is made the smallest (reference amount).

In this way, by changing the amount of ink ejected by each of the nozzles 4N in flushing processing in accordance with the positional relationship between flushing areas 31 and the sheet-to-sheet intervals between a plurality of sheets S conveyed by the conveying belt 30 (that is, the size of sheets S in the conveying direction), it is possible to reduce the amount of ink consumed in flushing processing while suppressing degradation of image quality.

In this embodiment, as described above, when the size of sheets S, in the conveying direction, used in successive printing is the reference size equal to or smaller than a predetermined interval FG, the control portion 6 makes the pair of registration rollers 11 convey the sheets S from the registration position to the conveying belt 30 at such timings that a non-overlapping flushing area 31A appears within every sheet-to-sheet interval between a plurality of sheets S conveyed in successive printing. In this way, when the size of sheets S used in successive printing is equal to or smaller than a predetermined interval FG, it is possible to increase the number of sessions of flushing processing per unit time.

In this embodiment, as described above, when, during successive printing, the control portion 6 makes the recording head 40 perform flushing processing, if overlapping flushing areas 31B appear during a non-flashing period between the previous and present sessions of flushing processing, the control portion 6 makes the amount of ink ejected by each of the nozzles 4N in the present session of flushing processing larger than the reference amount. Here, when overlapping flushing areas 31B appear in a non-flashing period, that means that the non-flashing period is longer than in successive printing using sheets S of the reference size. Thus, when overlapping flushing areas 31B appear during a non-flashing period, it is preferable to make the amount of ink ejected by each of the nozzles 4N in flushing processing larger than the reference amount.

Here, when sheets S are of a regular size, the positional relationship between the sheets S and flushing areas 31 has one of the patterns shown in FIG. 7. That is, when sheets S are of a regular size, it is possible to recognize the length of the non-flushing period in advance based on the size of the sheet S. However, when sheets S are of an irregular size, it is not possible to recognize the length of the non-flushing period in advance.

Figure 11:
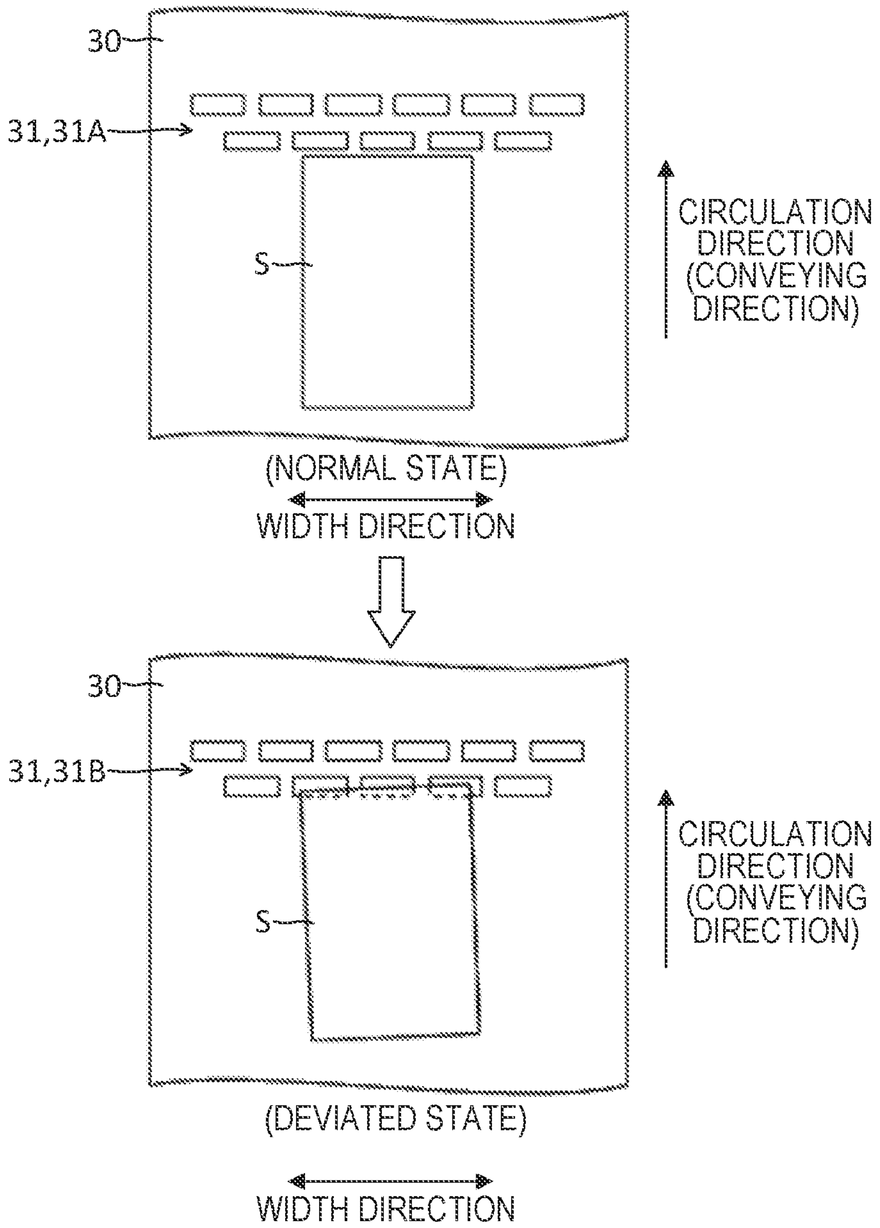
FIG. 11 is a diagram showing a state where a sheet has deviated on the conveying belt in the ink-jet recording apparatus according to the one embodiment.

For example, as shown in FIG. 11, even when sheets S are of a regular size, if any of the sheets S deviates, a flushing area 31 overlaps a sheet S although it is not supposed to. In FIG. 11, the upper diagram shows a normal state in which the sheet S is not deviated, and the lower diagram shows a state where the sheet is deviated. In this example, flushing processing is supposed to be performed when the flushing area 31 in the diagram faces the recording head 40. However, due to the deviation of the sheet S, even when the flushing area 31 in the diagram faces the recording head 40, no flushing processing is performed. As a result, the non-flushing period becomes longer than expected.

Thus, in this embodiment, when, during successive printing, the control portion 6 makes the recording head 40 perform flushing processing, the control portion 6 recognizes the number of times an overlapping flushing area 31B passes the position opposite the recording head during a non-flashing period between the previous and present sessions of flushing processing and, the larger the recognized number of times of passage, the larger the control portion 6 makes the amount of ink ejected by each of the nozzles 4N in present flushing processing. This ensures that, as a non-flashing period between the previous and present sessions of flushing processing becomes longer, the amount of ink ejected by each of the nozzles 4N in flushing processing is increased.

In this embodiment, as described above, when, during successive printing, the control portion 6 makes the recording head 40 perform flushing processing, the control portion 6 calculates the adjustment value by adding one to the number of times of passage, and uses the number of times calculated by multiplying the reference number of times by the adjustment value as the number of times of ink ejection by each of the nozzles 4N in the present flushing processing. In this way, it is possible to easily increase the amount of ink ejected (the number of times of ink ejection) by each of the nozzles 4N in flushing processing as a non-flashing period becomes longer (as the number of times of passage increases).

The embodiments disclosed herein should be understood to be in every aspect illustrative and not restrictive. The scope of the present disclosure is not limited by the description of the embodiments given above but by the appended claims, and encompasses any modifications made within a sense and scope equivalent to those of the claims.

What is claimed is:

1. An ink-jet recording apparatus comprising:

a conveying belt that is supported so as to be able to move around, the conveying belt conveying a recording medium by circulating;

a recording head that is arranged opposite the recording medium, the recording head having a plurality of nozzles that are arrayed in a width direction perpendicular to a circulation direction of the conveying belt, the recording head printing on the recording medium by ejecting ink from the nozzles;

a control portion that controls flushing processing by the recording head; and a registration portion that conveys the recording medium toward the conveying belt from a registration position which is a position on the upstream side, in a conveying direction, of a position where the conveying belt is provided, wherein the conveying belt has a plurality of flushing areas with openings formed therein, the flushing areas are arranged at predetermined intervals from each other in the circulation direction, the control portion, during successive printing on a plurality of recording media conveyed sequentially by the conveying belt, makes the recording head perform, as the flushing processing, processing in which ink is ejected from the nozzles toward the openings every time a non-overlapping flushing area, which is the flushing area that does not overlap the recording medium, faces the recording head and makes the recording head perform no flushing processing when an overlapping flushing area, which is the flushing area that at least in a part of it overlaps the recording medium, faces the recording head, and when, during the successive printing, the control portion makes the recording head perform the flushing processing, the longer a period between previous and present sessions of the flushing processing, the larger the control portion makes an amount of ink ejected by each of the nozzles in the present session of the flushing processing, the control portion controls conveyance of the recording medium to the conveying belt by the registration portion to adjust a sheet-to-sheet distance, which is an interval between the recording medium conveyed previously and the recording medium to be conveyed next, and when a size of the recording medium, in the conveying direction, used in the successive printing is a reference size equal to or smaller than the predetermined interval, the control portion makes the registration portion convey the recording medium from the registration position to the conveying belt at such timings that the non-overlapping flushing area appears within every the sheet-to-sheet interval between the plurality of recording media conveyed in the successive printing, when the size of the recording media, in the conveying direction, used in the successive printing is the reference size, the control portion sets the amount of ink ejected by each of the nozzles in the flushing processing at a prescribed reference amount, and when, during the successive printing, the control portion makes the recording head perform the flushing processing, if the overlapping flushing area appears between the previous and present sessions of the flushing processing, the control portion makes the amount of ink elected by each of the nozzles in the present session of the flushing processing larger than the reference amount, when, during the successive printing, the control portion makes the recording head perform the flushing processing, the control portion recognizes a number of times the overlapping flushing area passes by a position opposite the recording head during a period between the previous and present sessions of the flushing processing and, the larger the number of times of passage, the larger the control portion makes the amount of ink ejected by each of the nozzles in the present session of the flushing processing, the amount of ink ejected by each of the nozzles becomes equal to the reference amount when ink ejection is performed a prescribed reference number of times, and when, during the successive printing, the control portion makes the recording head perform the flushing processing, the control portion calculates an adjustment value by adding one to the number of times of passage, and uses the number of times calculated by multiplying the reference number of times by the adjustment value as the number of times of ink ejection by each of the nozzles in the present session of the flushing processing.

* * * * *